Jan. 30, 1973  P. C. SYMONS  3,713,888
PROCESS FOR ELECTRICAL ENERGY USING SOLID HALOGEN HYDRATES
Filed June 26, 1970  5 Sheets-Sheet 4

United States Patent Office 3,713,888
Patented Jan. 30, 1973

3,713,888
PROCESS FOR ELECTRICAL ENERGY USING SOLID HALOGEN HYDRATES
Philip C. Symons, Birmingham, Mich., assignor to Oxy Metal Finishing Corporation, Warren, Mich.
Filed June 26, 1970, Ser. No. 50,054
Int. Cl. H01m 35/00
U.S. Cl. 136—6
19 Claims

ABSTRACT OF THE DISCLOSURE

A process for the useful storage of electrical energy employing halogen hydrates is described. The halogen hydrate can be generated during the charging of a secondary battery or may be chemically generated and placed in a primary battery.

BACKGROUND OF THE INVENTION

Batteries of high energy density are desirable in a number of end uses. High energy density batteries are those which generally can produce at least 50 watt hours per pound (for a secondary battery). A number of secondary batteries have been designed to improve energy capacity. Such a system is described in U.S. Pat. 3,328,202 wherein liquid bromine is absorbed on an activated charcoal electrode. Another concept is that described in U.S. 3,236,694 wherein cesium bromide is used as electrolyte and used to absorb the electroactive material. Numerous patents describe the use of aqueous metallic halide solutions as electrolytes with halogens as electroactive materials. One of the earliest, U.S. 1,377,722 describes the use of liquid chlorine under pressure. An early reference which describes the preparation of chlorine hydrate by the separation of chlorine from gas mixtures is British specification 13,647 published 1887. The difficulty with the prior art batteries is that there has been no real method described for producing a material which could be generated from and be reconstructed into the electrolyte in order to continuously charge and discharge a battery.

SUMMARY OF THE INVENTION

The invention is concerned with a method of conveniently storing halogen by employing halogen hydrates for use in electrical energy storage devices, such as, primary and secondary batteries. The invention is also concerned with a method for producing halogen hydrates in secondary batteries. Halogen hydrates provide a convenient means of storing halogens to be used in the discharge of primary and secondary batteries since they allow the concentrations of halogen and electrolyte to be controlled easily. The halogen hydrate produced during the charging of a secondary battery is a convenient means of storing the halogen until it is used during the discharge of the secondary battery. Another aspect of the invention is the production of an electrolyte from the halogen hydrate for use during the discharging of a secondary battery.

It is, therefore, an object to produce a composition which can be stored and subsequently used to generate electricity.

It is also an object to reduce the dendrite formation in the operation of a secondary battery when generating the storable compositions.

DESCRIPTION OF THE PREFERRED EMBODIMENTS

A process is described for producing a halogen hydrate in a housing containing an electrode area with at least one positive and one negative electrode therein, comprising:

(1) Passing a current through an aqueous metal halide solution, thereby generating halogen at the positive electrode, (2) Forming a halogen hydrate, and (3) Separating the halogen hydrate from the solution.

A preferred embodiment is the production of the halogen hydrate in a rechargeable electrical energy storage device, such as, a secondary battery.

The battery can be described as follows:

A battery comprising:

(1) An electrode area with at least one positive and one negative electrode therein, (2) A storage area with a halogen hydrate therein, (3) An electrolyte, and (4) Communicative means between said electrode area and said storage area.

A preferred embodiment of the battery is the use of a means to pass the halogen hydrate from the storage area through the communicative means to the electrode area. Such a means could be a pumping means or the use of some positive action such as the use of gravity flow or other means obvious to one skilled in the art.

By communication means is meant any means to allow the electrode area to be in contact with the storage area. This can be performed by pipes, glass tubes, or an open channel in the electrodes themselves so that halogen hydrate may be formed in electrode area and stored in electrodes, under appropriate temperature and pressure conditions. The recesses of the electrodes may be maintained at a cooler temperature than the surface thereby permitting storage of halogen hydrate.

A third aspect of the invention is the production of an aqueous metal halide electrolyte solution which is used in the discharge phase of the battery. The process can be described as a method for producing an aqueous metal halide solution for use as an electrolyte in an electrode area containing at least one positive electrode and one negative electrode with a metal surface, comprising:

(1) Passing a halogen hydrate into an electrolyte, and (2) Passing said electrolyte into the electrode area.

In a preferred embodiment, a plurality of cells (consisting of one positive and one negative electrode) may be joined together to increase the battery capacity. On the other hand, the electrode area can also be increased in size so that many positive and negative electrodes are contained therein.

In the production of a halogen hydrate, reference can be made to the diagrams.

Figure 1:
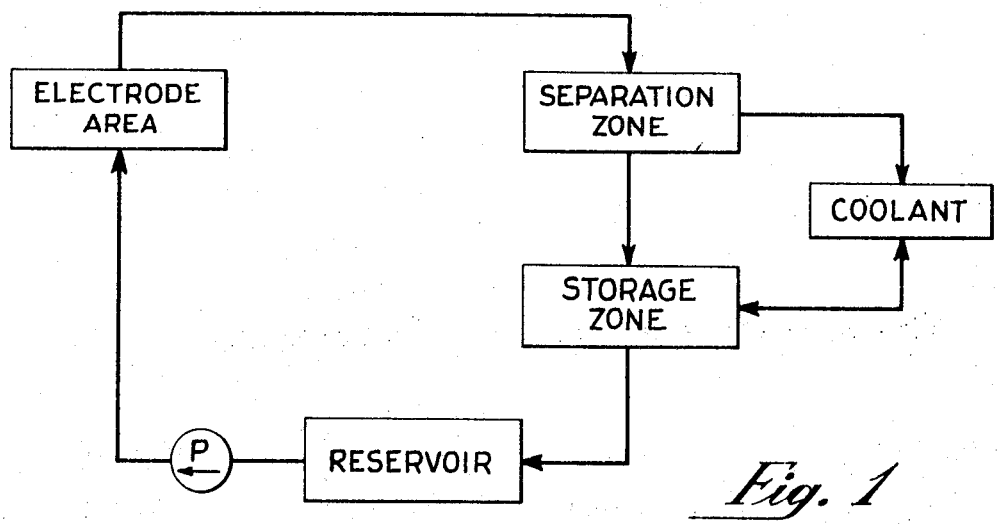
FIG. 1 is a flow diagram of the overall preparation and storage of halogen hydrate.

In FIG. 1, a reservoir of electrolyte is pumped to an electrode area containing at least one positive and one negative electrode. During the charging state, a halogen gas will form at the positive electrode. Since the solution is flowing through the electrode area the halogen formed will likewise be carried through said line.

The solution will then pass into a separation zone maintained at a sufficiently cool temperature to cause solidification of the halogen hydrate while the electrolyte remains a liquid. The halogen hydrate may be separated from the electrolyte by any suitable means, such as filtration. Glass wool is a suitable filtration mechanism. The halogen hydrate is then stored in a storage zone. A pumping means maintains the flow of coolant from a reservoir in the storage zone to and from the separation zone. The electrolyte solution will then continue back to the reservoir electrolyte solution.

In a primary cell, halogen hydrate can merely be passed from a storage area, internal or external to the battery, to the electrode area. By saying that the halogen hydrate passes to the electrode area from the storage area is meant that the halogen hydrate, because of its low decomposition temperature, may not be a halogen hydrate when the electrode area is reached. What is meant is that the halogen hydrate or its decomposition products of chlorine and water are passed into the electrode area via the electrolyte.

In a primary battery, the halogen electrode, i.e., the electrode at which halogen is generated or dissolved at, should be chemically indifferent or inert, such as, graphite or catalyzed graphite, platinum, ruthenium dioxide on titanium, platinum on titanium, or a noble metal alloy on a base or valve metal. Other electrodes could be used which are obvious to one skilled in the art. Some electrodes are described in U.S. 2,572,296.

The metal electrode of a primary battery may be composed of any metal which will dissolve electrochemically. The electrode may be a solid metal eelctrode or the metal may be deposited onto an indifferent or inert substrate. Suitable electrode surfaces may be metals such as zinc or aluminum.

During the charging process in a secondary battery, the metal halide electrolyte solution will be pumped through the electrode area whereby a metal will plate out onto the negative electrode and halogen will form at the positive electrode. The halogen will be converted to a halogen hydrate generally in an area separate from the electrode area such as in separation zone and will be stored in a storage area.

There are two concepts at this phase of charging. The first deals with the formation of a halogen hydrate which is a solid material in a liquid electrolyte. The second concept deals with the separation of solid from liquid and the storage of said solid halogen hydrate for subsequent usage.

During the discharge of either a primary or a secondary battery, electrolyte is pumped to the electrode area after passing through the storage area thereby obtaining halogen hydrate which dissolves into the electrolyte. Halogen at the positive electode combines electrochemically with the metal at the negative electrode to produce useful electrical energy. The electrolyte will return to the separation zone and since it is deficient in halogen, it will dissolve more halogen. This will result in decomposition of halogen hydrate in the storage area whereby halogen and water will return to the separation area to maintain equilbrium. This process will continue during discharge until all halogen hydrate has been used.

A preferred embodiment of the invention is when the electrode area, separation area and storage area are separated from each other. However, it is not necessary for the operation of the invention. Usually the halogen hydrate is formed when it passes through the separation zone. In certain devices the halogen hydrate may be produced in the electrode area under the proper temperature and pressure conditions and stored in the solid form in a porous electrode. An alternative way is to store the halogen hydrate external to the electrodes.

The electrolyte solution could be any solution which will permit the formation of a halogen hydrate. In later discussion, reference will be made to the most preferred embodiment, chlorine hydrate. However, it is understood that all halogen hydrates are to be considered. At the present time only two hydrates are known, i.e., chlorine hydrate and bromine hydrate. While applicant does not wish to limit the scope of his invention to a particular theory, it is believed that chlorine hydrate is of the formula $Cl_2 \cdot 8H_2O$ and bromine hydrate of the formula $Br_2 \cdot 10H_2O$.

The source of halide preferably is from an aqueous metal halide solution. The halogen is formed during the electrochemical charging process. The choice of a metal is primarily dependent upon its ability to plate out on to an electrode surface during charging. Along these lines, zinc is the most preferred metal. The use of zinc as the metallic portion of a metal halide solution is desirable because of its ease of being deposited from an aqueous solution. The zinc deposition is smooth and large surfaces could be deposited. The most preferred embodiment is an aqueous solution of zinc chloride. Preferred metal halides are halides of iron, cobalt, nickel, or other Group VIII metals of the Periodic Table listed in the Handbook of Chemistry and Physics. 43d edition (1961–1962). The most preferred halides are chlorides and bromides. Other metal halides that may be employed are the halides of the lanthanide and actinide series as well as the halides of Sc, Ti, V, Cr, Mn, Cu, Ga, Y, Zr, Nb, Mo, Tc, Ru, Rh, Pd, Ag, Cd, In, Sn, Hf, Ta, W, Re, Os, Ir, Pt, Au, Hg, Tl, Pb or Bi.

The electrolyte solutions employed in this invention may have a variety of other components therein to decrease corrosion, reduce dendrite formation, increase electrolytic conductivity, etc.

In secondary batteries, the most preferred electrolyte is an aqueous one. Other electrolyte systems may be used which are compatible, i.e., chemically stable to the metal halide and the halogen hydrate. Generally these systems are polar systems.

For primary batteries some electrolyte systems that can be employed are lower aliphatic alcohols and ketones, such as, methanol, ethanol, acetone, etc., as well as mono methyl formamide, dimethyl sulfoxide and propylene carbonate.

The concentration of the aqueous metal halide electrolyte employed in this invention ranges from about 0.1% by weight to saturation. Preferably about 5% to saturation and even more preferably about 10% to about 50% by weight.

Figure 2:
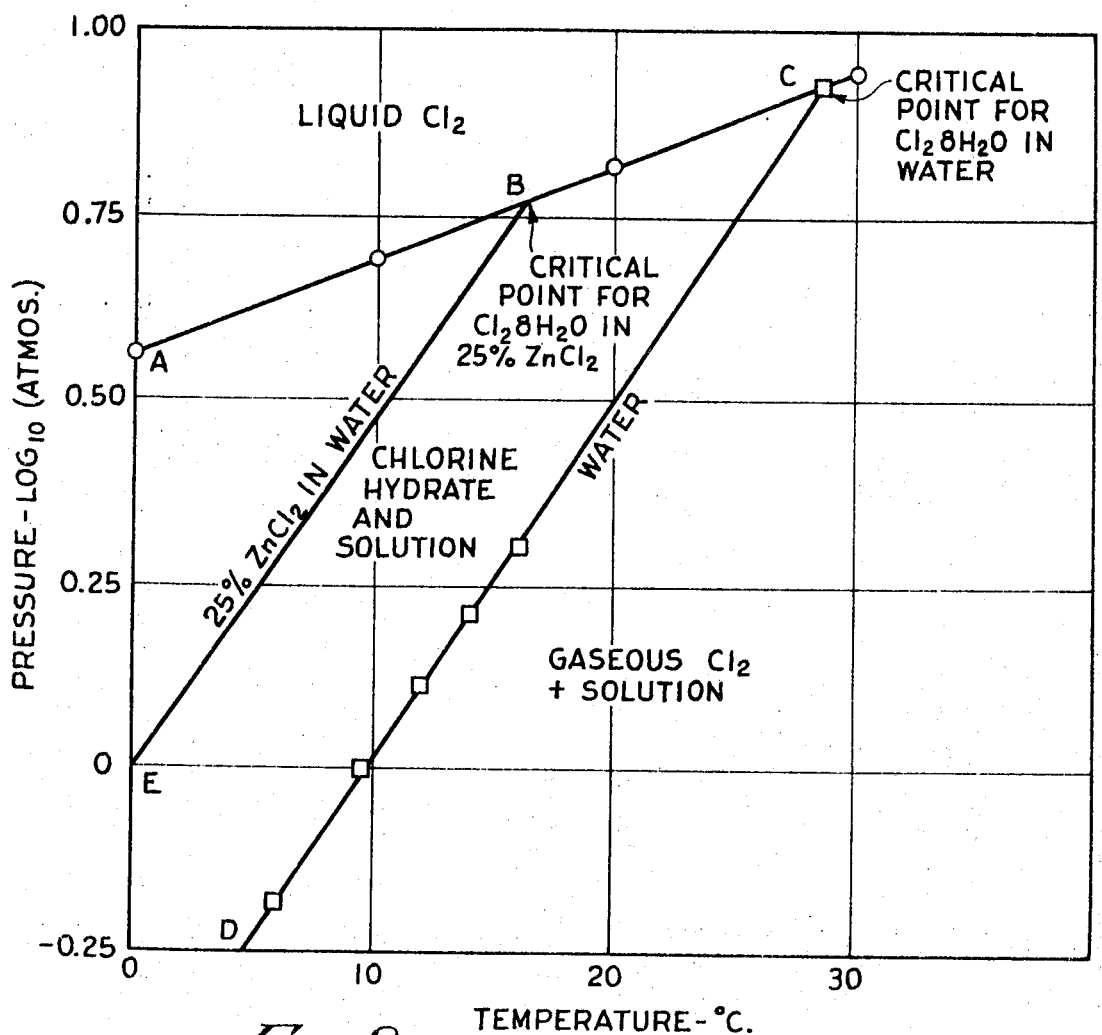
FIG. 2 is a phase diagram for the system chlorine/water/zinc chloride.

The formation of chlorine hydrate is dependent upon the concentration of chloride ions in the electrolyte, the concentration of metal ions and the temperature and pressure of the electrolyte solution. FIG. 2 is a phase diagram for chlorine, water and zinc chloride solutions wherein the pressure ($\log_{10}$ in atmospheres) is plotted versus temperature in ° C. The critical point of chlorine hydrate in a 25% by weight $ZnCl_2$ solution is about 16° C.

The temperature and pressure for the electrode area may be varied within wide limits from the freezing point to the boiling point of the electrolyte. It is preferred that the temperature range from about 0° C. to about 75° C. while the pressure ranges from about 0.05 atmosphere to about 15 atmospheres. A more preferred range is from about 10° C. to about 60° C. while the pressure ranges from about 0.2 atmosphere to about 10 atmospheres. The temperature for the storage zone during the charging state is from the freezing point of the electrolyte solution to the critical temperature of the halogen hydrate. During standing, i.e., when there is not a charge or discharge, any temperature may be employed sufficient to keep a halogen hydrate formed. Suitable temperature and pressures may be obtained from FIG. 2 for a 25 percent by weight zinc chloride solution.

A preferred temperature for the storage area is one not higher than the critical temperature of the halogen hydrate. An even more preferred temperature range is from about −5° C. to the critical temperature of halogen hydrate. The critical temperature of a halogen hydrate is that temperature above which halogen hydrate can not be formed by pressure alone. This latter definition is in accordance with the definition of critical temperature in the "Handbook of Chemistry & Physics," 50th edition (1969–1970), p. F-72. When one is considering critical temperature, only one component and two phases are generally considered. However the invention described herein is concerned with 4 components, halogen hydrate and its decomposition products, chlorine and water and the metal halide while there are three phases, solid, liquid and gas. Therefore the critical temperature of a halogen hydrate can also be defined as that temperature above which a halogen hydrate cannot exist. The phase diagram of FIG. 2 outlines the critical temperature of the most preferred embodiment, chlorine hydrate.

In the area bounded by points ACD, chlorine hydrate is present as a solid in water. Below the line CD, gaseous chlorine is present in water. Further liquid chlorine is present above the line AC. In the area bounded by ABE, chlorine hydrate is present as a solid in a 25% concentration of zinc chloride in water.

The electrodes for a secondary battery could be any electrode normally used in electrochemical reactions such as graphite, noble metal such as platinum or gold, metal plated electrodes, such as a platinum family metal or its alloys coated on titanium, or other valve metal; some examples are ruthenium dioxide or platinum-iridium coated titanium, or tantalum, etc. The electrodes may be bipolar or monopolar. In order to increase conductivity, the electrodes may also be fluidized electrodes such as that described in application No. 7,208, published in Holland on Nov. 27, 1967, corresponding to British application 23,070 of the National Research Development Corporation now British specification 1,194,181. Significant improvements in current densities can be obtained when metal plated electrodes are used such as those mentioned above.

A diaphragm may be used to separate the anode and cathode compartments. The diaphragms that can be used are those normally employed in the electrochemical art such as polytetrafluoroethylene-coated fabrics, polyethylene, membranes of selected ion permeability, etc. The criteria for the diaphragm are that it efficiently separates the two compartments, allows the ions to pass therethrough and is chemically and mechanically stable.

Any means to separate a solid from a liquid may be used to separate halogen hydrate from the aqueous electrolyte. Such means are filtration, crystallization under appropriate temperature and pressure conditions to obtain the solid, etc.

The distinct advantage of this new type of battery is that from a zinc chloride solution a substance, chlorine hydrate, can be formed and stored during the charging phase. Since zinc is plated onto the negative electrode and chlorine and water are removed as chlorine hydrate, the concentration of the electrolyte solution can remain reasonably constant. During the discharge phase, the concentration of electrolyte also remains reasonably constant because zinc, chlorine and water are added to the electrolyte by zinc being removed from the electrodeposit and chlorine hydrate decomposing into the electrolyte, The fact that during discharge the electrolyte remains at a reasonably constant concentration is important because as the concentration of an electrolyte increases above a certain point (which will vary with electrolyte), the internal resistance of a battery will increase, thereby decreasing discharge efficiency of the battery. By "reasonably constant" is meant that the concentration of the electrolyte has a definite range. This phenomenon is further exemplified in the concentration range of 20–25% $ZnCl_2$ in Example 2.

The use of chlorine hydrate is a simplified way of storing chlorine without having to compress it. When zinc chloride is employed as an electrolyte, maximum conductivity occurs at a concentration of about 25% by weight and chlorine hydrate will form at atmospheric pressure. See FIG. 2. However, conductivity-concentration curves are reasonably flat at concentration levels from about 15% to about 35% by weight.

Having described the invention in general, below are examples of embodiments of the invention. All temperatures are in degrees centigrade and all percentages are parts by weight, unless otherwise indicated.

EXAMPLE 1

Figure 3:
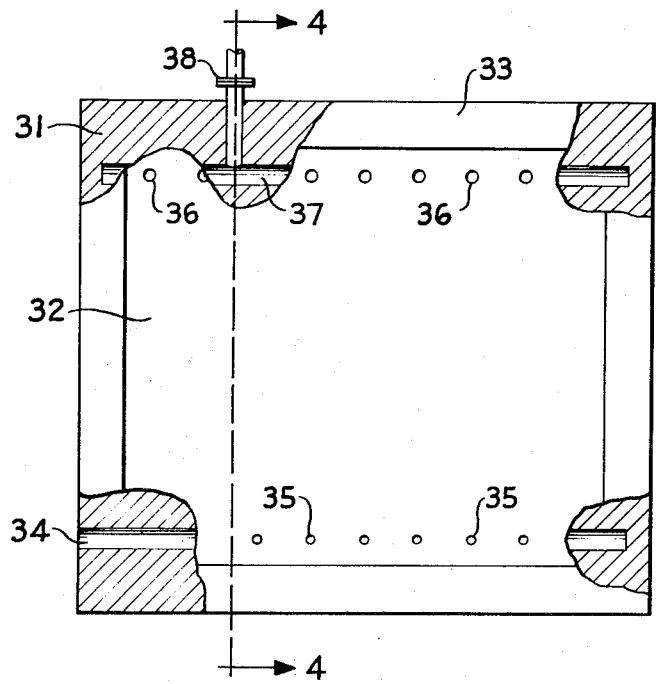
FIG. 3 is a sectional view of an electrode that may be used in the operation of the invention.
Figure 4:
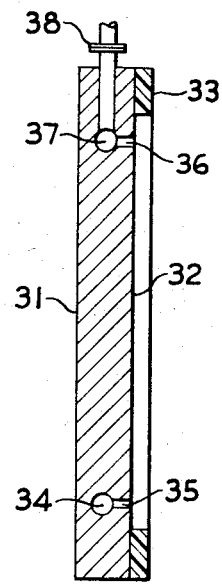
FIG. 4 is a side sectional view along lines 4—4 of the electrode of FIG. 3.

A single cell battery was constructed from one inch thick graphite plates 31 drilled to allow an even distribution of electrolyte as is shown in FIGS. 3 and 4. Two identical plates (see FIGS. 3 and 4 for one plate) 6" x 8" with 5½" x 7" of active plate area 32 were mounted 1/32" apart using a gasket of Teflon (trademark for polytetrafluoroethylene) sheet 33. No diaphragm was used to separate the cell into compartments in order to simplify operation. Solution containing 25 percent by weight zinc chloride in water and stored in a glass round bottomed flask, was pumped to the cell through distribution hole 34 at about 100 mls./min. per electrode side using a peristaltic pump. The solution passed through holes 35 1/32" in diameter thereby coming in contact with the active area. The solution passed through holes 35 1/16" in diameter at the top of the cell through opening 37 and out the Teflon pipe fitting 38. From the top of the cell, solution was passed to the top of a bulb condenser and therein formed a film of solution on the bulb walls. The solution fell by gravity down the walls and into a glass tube containing glass wool to act as a filter. The glass filter tube was immersed in a 5-liter beaker of an ice/salt mixture maintained at $-5°$ C. The cold brine was pumped to the jacket of the bulb condenser and then returned to the 5-liter beaker. Electrolyte solution passed by means of a siphon from the filter to the solution store and was thence recirculated. The battery plates were coated with Teflon spray and Teflon emulsion and then baked at about 250° C. to minimize leakage. The two battery plates were held together with G-clamps.

About 450 mls. of zinc chloride solution (25% by weight) was placed in the flask and the peristaltic pump was started to circulate solution through the system. A current of about 10 amps was passed through the battery from an Anotrol potentiostat in the potential control mode; this corresponding to about 40 ma./$cm.^2$. The current was passed for 100 mins. Gas was observed in the solution coming from the electrode area and passing to the glass tube. A light yellow solid was formed in the tube which was identified as chlorine hydrate. The solid was successfully separated on the glass wool.

At the completion of charging, a potential difference of 2.1 volts was observed between the battery plates.

An ammeter was connected directly between the electrodes. The solution was continuously pumped throughout the apparatus. Initially, currents up to 15 amps at 1.2 volts could be drawn from the cell. After about one minute of discharge, a current of 5 amps at 0.8 volt was observed. Chlorine for discharge of the battery was provided by decomposition of the chlorine hydrate. The battery was discharged for a short time only to allow observation of the zinc electrodeposit. The zinc deposit was flat and looked microcrystalline under the microscope. There were areas upon which there was no electrodeposited zinc—especially close to the solution inlet—which is expected since no diaphragm was used in the cell.

EXAMPLE 2

Figure 5:
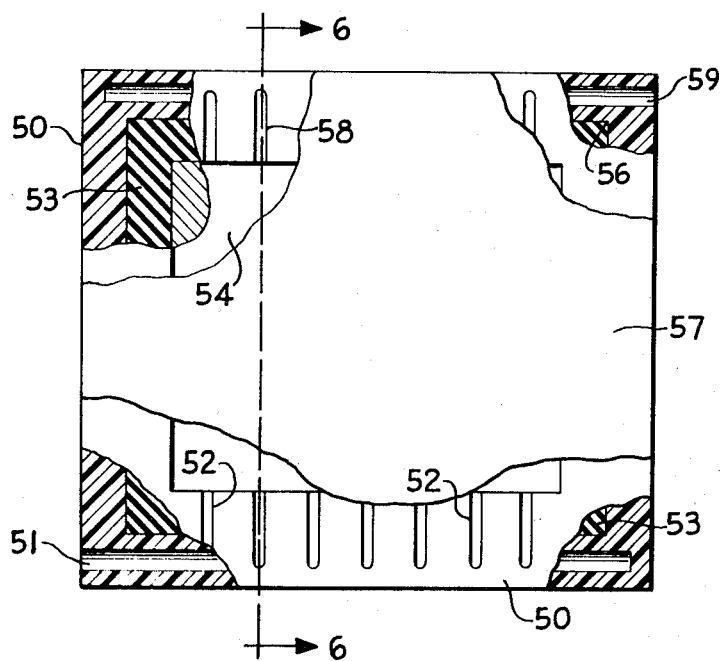
FIG. 5 is a sectional view of another type of electrode as is described in Example 2.
Figure 6:
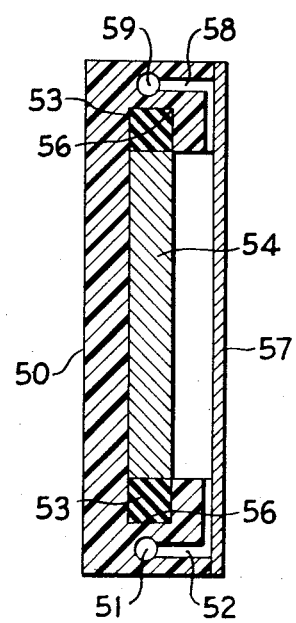
FIG. 6 is a side sectional view along lines 6—6 of the electrode of FIG. 5.
Figure 7:
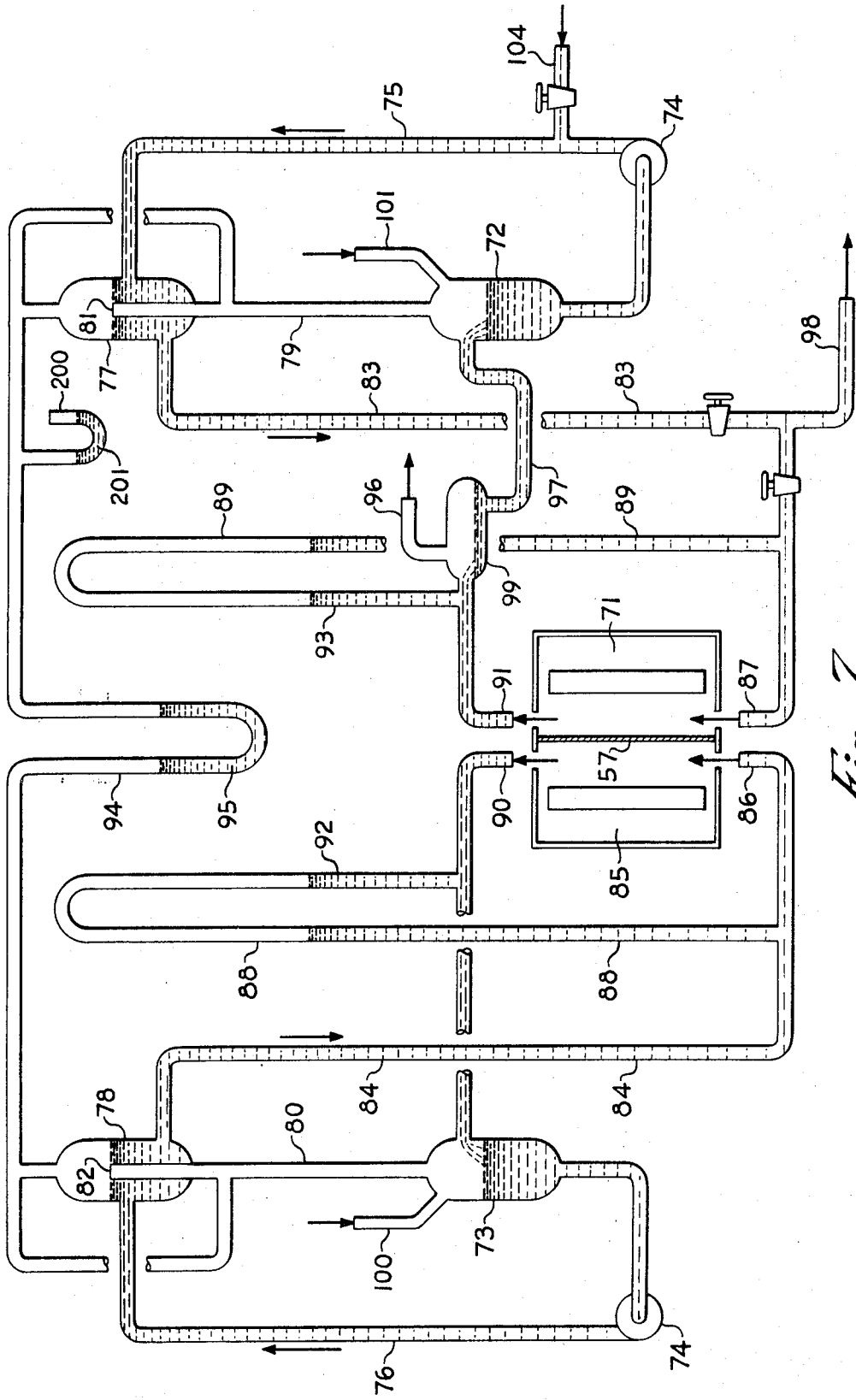
FIG. 7 is a front view of an embodiment of the invention showing an electrode area.
Figure 8:
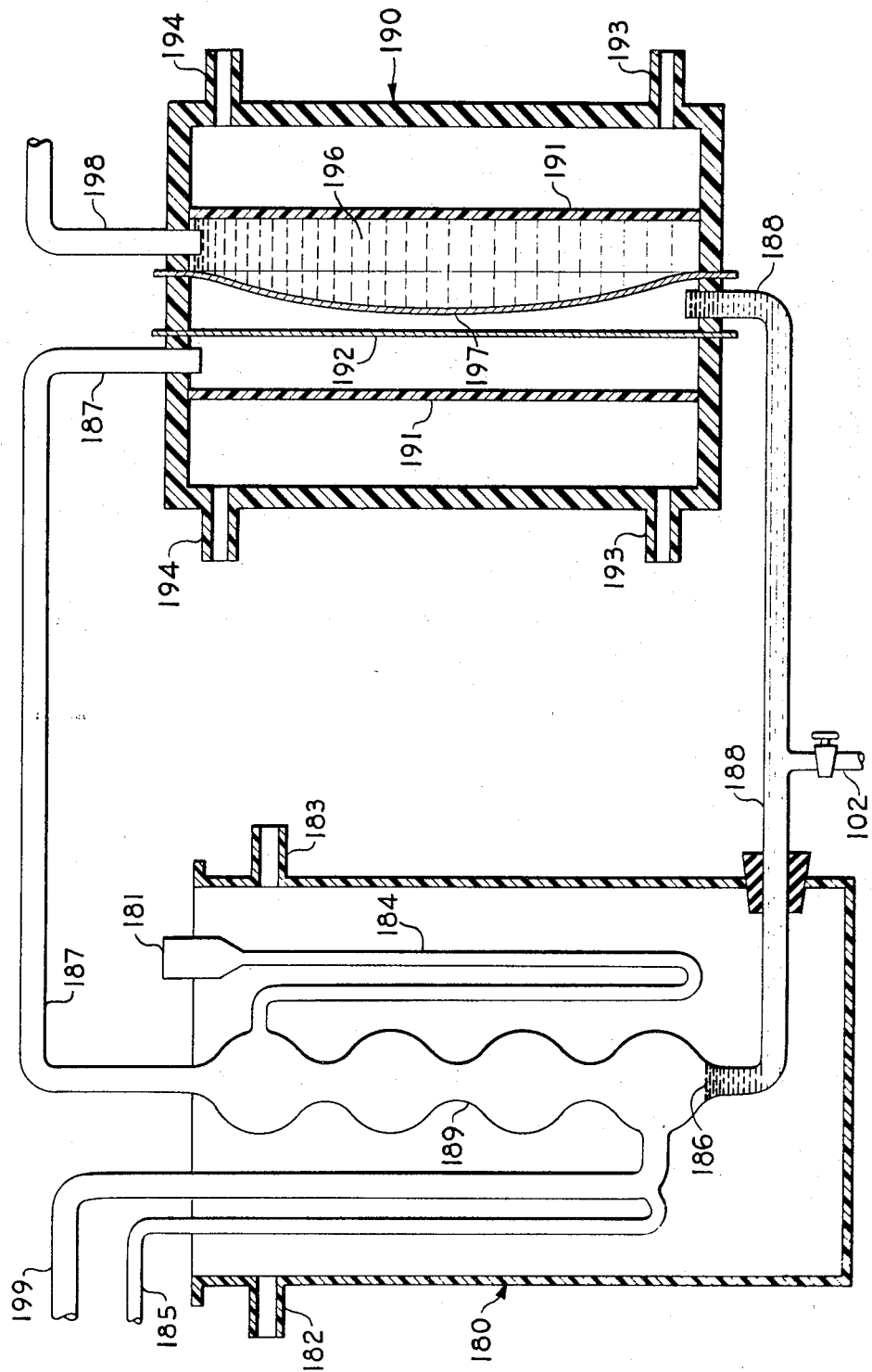
FIG. 8 is a sectional view of another type of separation and storage area.
Figure 9:
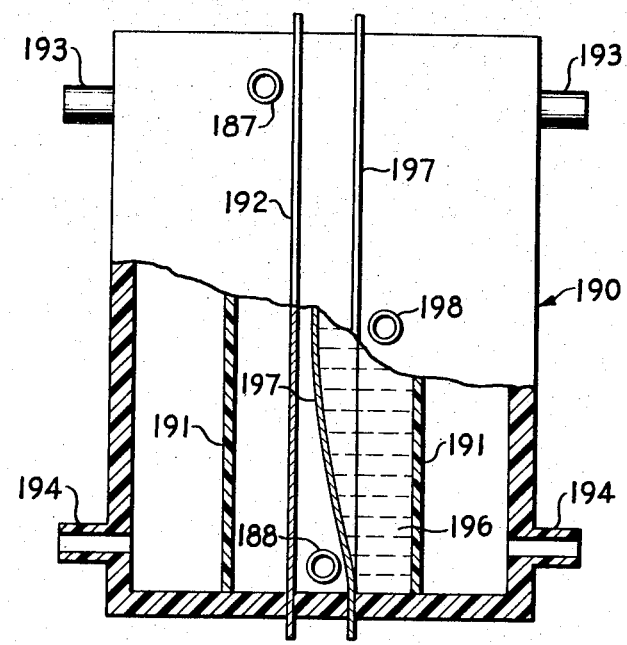
FIG. 9 is a top sectional view of the storage area, i.e., the right side of FIG. 8.

A single cell battery using graphite electrodes with Plexiglas frames 50 and a picture-frame construction was made as shown in FIGS. 5 and 6. FIG. 5 shows a half-cell; two of these being bolted together to form a one-cell battery. The distance between the active electrode surfaces is 1/16". The electrode frame 50 has a zinc chloride solution inlet 51 and distribution holes 52. A rubber gasket 53 fits snugly around the graphite electrode 54. The electrode and gasket fit in air and water tight fashion into the indentation 56 of the electrode frame. Two separate flow systems were used to arrange flow in the two compartments of the cell which are separated by the Teflon paper diaphragm material 57 made by Pall-flex Products. These flow systems, which are constant hydrostatic head devices used to maintain constant flow rates, are shown in FIG. 7, and were constructed from glass. Gum rubber connections were made for the cell. FIG. 7 also shows manometers used to monitor the rate of flow through the two compartments of the cell, and to insure that no pressure difference was exerted on the diaphragm. Solution flowing from the chlorine compartment 71 of the cell was first passed to a gas separator 99 as shown in FIG. 7. The gas phase of this gas separator was directly connected to the gas absorber and chlorine hydrate former shown in FIG. 8, left side. This apparatus in turn was connected via a peristaltic pump to the chlorine hydrate separator and solution reservoir shown in FIG. 8 right side.

During charge and discharge, a flow of about 300 mls./min. per electrode side of 20% by weight of zinc chloride solution was passed into the chlorine compartment 71 of FIG. 7 where chlorine gas was formed during the charging phase by the electrolysis of zinc chloride. The flow of solution through the apparatus of FIG. 7 is as follows. Zinc chloride solution from reservoirs 72 and 73 is pumped via pumps 74 through lines 75 and 76 to reservoirs 77 and 78 which are maintained at a constant head by means of connecting tubes 79 and 80 which are open ended at 81 and 82 which permits the excess to flow back to the reservoirs 72 and 73, respectively. The solutions flow through lines 83 and 84 to the chlorine compartment 71 and the zinc compartment 85 through openings 87 and 86, respectively. Sufficient pumping pressure is maintained to keep solution in lines 88 and 89. Electrolyte flows into the electrode inlet 51 (of FIGS. 5 and 6) and through distribution holes 52. The solution passes the active surface area 54 and out distribution holes 58 through outlet 59. Solution exits from the chlorine compartment through exit 91 while solution exits through exit 90 of the zinc compartment. In order to maintain constant pressure on the diaphragm 57, solution is also in lines 92 and 93 which are attached to exit lines 91 and 90 of the chlorine and zinc compartments, respectively. In addition, a manometer 94 is connected between reservoirs 77 and 78 with zinc chloride solution 95 therein as a means of visually determining the pressure differential between both electrode compartments. The solution with entrained chlorine gas was passed from the chlorine chamber 71 to the gas separator 99. Sufficient electrolyte solution is maintained in the gas separator to allow the chlorine gas to exit out line 96. The electrolyte solution was returned to the flow system through line 97. The chlorine gas was passed to the chlorine hydrate former 180. See FIG. 8 left side. The chlorine hydrate former is an apparatus that is maintained at a desired temperature by means of a circulating coolant which enters via 182 and exits via 183. Here, the gas enters through 181 and is first precooled as it passes through line 184. The gas then meets a falling film of 20% zinc chloride solution formed on the inner surface of a bulb condenser. This solution is excess zinc chloride solution from the chlorine hydrate separator (right side FIG. 8) which enters via line 187. Also zinc chloride solution from the chlorine compartment 71 exits through line 98 of FIG. 7 and enters the chlorine hydrate former (FIG. 8 left side) through line 185. A constant level 186 of zinc chloride solution is maintained at the bottom of the bulb condenser. Chlorine hydrate is formed and collects with excess solution at the bottom of the bulb condenser. From here, the peristaltic pump (not shown) was used to pass chlorine hydrate with solution through line 188 to the chlorine hydrate separator 190. The separator is formed of Plexiglas (trademark for thermoplastic poly methylmethacrylate). Two Plexiglas sheets 191 are placed in the separator 190 to form a storage area for the halogen hydrate. A filter 192 is positioned in the storage area formed by the two sheets. The zinc chloride solution with chlorine hydrate therein enters the separator through line 188, which separator is maintained at a desired temperature by means of coolant which enters through lines 193 and exits through lines 194. The chlorine hydrate is separated on the Teflon filter cloth 192 and excess solution exits via 187 of the separator and enters the chlorine hydrate former at the top of the bulb condenser 189 to absorb more chlorine hydrate. In order to maintain adequate pressure on the filter 192, a reservoir of 25% zinc chloride solution 196 of about 500 ml. was placed in the chlorine hydrate separator. The reservoir was separated from the chlorine hydrate by means of a Teflon sheet 197 which acts as a bellows. As the filter 192 became filled with chlorine hydrate, solution from the reservoir was forced out exit line 198 and returned to the zinc electrode reservoir 73 via line 100.

In order to maintain a constant volume and constant pressure, a glass line 199 was connected between the chlorine hydrate former (FIG. 8, left side) and the chlorine electrode reservoir 72. The gas line for the latter reservoir is identified as line 101.

During charge, an amount of solution just necessary to absorb chlorine and cause a concentration change from 20 to 25% in zinc chloride was taken continuously from the chlorine electrode compartments 71 via line 98 and passed to the chlorine hydrate former (FIG. 8) via line 185. This caused the level 186 to rise in the hydrate former unit, so solution was periodically removed from the hydrate former system via line 102 to maintain the level in the absorber. This zinc chloride was directed via 102 to the chlorine electrode reservoir via 101 rather than going to the chlorine hydrate separator via line 188. In essence, there is a continuous loop between the chlorine hydrate former and the chlorine hydrate separator. The solution is continuously circulated until the level 186 in the hydrate former rises. On discharge, this level is such that solution flows back to the chlorine electrode reservoir. The chlorine hydrate part of the system was cooled by passing coolant from a refrigerator bath at −5° C. around the hydrate former and separator units. The system was sealed by a manometer 200 and filled with water 201, so that the system operated at 5″ of water head above ambient pressure.

In a typical experiment, the battery was charged at a rate of 8 amps for 1 hour. The voltage under these conditions was about 2.9 volts. During the charging process, chlorine hydrate was observed to form in line 184 as a pale yellow solid. Observation of the separator unit showed that chlorine hydrate was collecting on the filter 192, during charge. After 1 hour, the charging current was switched off, so that a total charge of 8 amp hours had been put into the battery. Five minutes after switching off the charging current, a voltage of 2.134 volts was observed between the zinc and chlorine electrodes, and after nine minutes, the voltage was 2.129 volts. Ten minutes after turning off the charging current, a discharge current of 2 amps was started. One minute after the start of discharging, the voltage observed between the two plates was 1.385 volts; and after 2½ hours 1.146 volts. After this time, the cell voltage dropped rapidly so that after 3 hours it was 0.858 volt, the drain on the battery being 2 amps. Thereafter, current and voltage dropped concurrently, so that after 3¼ hours the current was 0.23 amp at a cell voltage of 0.060 volt. The battery was then completely discharged. During discharge, the system's pumps were turned on, the chlorine hydrate portion of the system (FIG. 8) was warmed and therefore chlorine and water were formed as thermal decomposition products of chlorine hydrate. As this occurred, the level 186 in the chlorine hydrate former rose thereby causing the zinc chloride solution to return via line 102 to the chlorine electrode reservoir 72 via line 101. This process occurred smoothly, and chlorine hydrate was observed to disappear from the filter unit. In order to simplify operation and to insure that the zinc electrode controlled the total charge of the battery, chlorine gas was supplied from a cylinder (not shown) to the chlorine hydrate part of the system via line 104 during discharge. This was not done continuously but periodically when some of the chlorine hydrate was observed to have disappeared from the filter element.

A total of 6.267 amp hours were removed from the battery during discharge, so that the total charge efficiency was 78.3%.

The interaction of the various functional aspects of the system must be considered as one operates the system. Charging rates is such an example. The charging rates can be varied within wide ranges. The following factors should be considered in determining a charging rate; if the charging rate is too low, the time for total charging in the battery will be impractically long; if the charging rate is too high, the rate of heat generation within the battery will be unacceptable either because of heat damage or since the heat generated will be in excess of the heat that can be removed from the cooling system; and if the charging rate is too high, the zinc electrodeposit will be unsatisfactory because of nonadherence or excessive dendrite formation. It is preferred that charging rates range from about $10^{-5}$ amps per square centimeter to about 10 amps per square centimeter, preferably $10^{-3}$ amps per square centimeter to about 0.5 amp per square centimeter and even more preferably $10^{-2}$ amps per square centimeter to about 0.2 amp per square centimeter.

Solution flow rate is another example of a system parameter. The flow rate utilized in Example 2 is significantly different from that used in Example 1. In Example 1, the chlorine gas entrained in the solution was moved directly from the electrode area to separation and storage areas. In Example 2, on the other hand, to reduce amount of material which needs to be cooled, the gas is separated from the electrolyte via separator 97 and is precooled in the chlorine hydrate former in line 184. Chlorine hydrate is formed and then meets the excess zinc chloride solution from the chlorine hydrate separator in the bulb condenser 189. The magnitude of the flow rate will depend upon the size of the electrodes and the distance between the electrodes. The criteria for determining an appropriate flow rate may be as follows: during charging the solution flow rate is such that gas pockets do not form in the chlorine compartment 71; during charging, the solution flow rate is such as to keep dendrite formation within manageable limits; a constant flow of electrolyte decreases dendrite formation; during discharge the solution flow rate on the chlorine side should be large enough to keep electrode polarization low within practical limits; during discharge, the solution flow rate should not be so high that excessive amounts of energy are used for pumping; and during charge and discharge, this solution flow rate should not be so high as to cause excessive transfer of chlorine from the chlorine side to the zinc side.

For an electrode that is approximately 10 centimeters wide by 12 centimeters high (about 120 square centimeters), preferred flow rates per electrode side can range from about 50 milliters per minute to about 500 milliliters per minute during charge and discharge. However, flow rates of approximately one milliliter to about 5,000 milliliters per minute per square centimeter electrode surface are also rates that could be employed. Since the flow rate is mainly volume determinative, i.e., one considers the flow of the solution through the entire electrode chamber, one therefore must take into account the distance from one electrode surface to the other electrode surface or to the diaphragm therebetween, if one is employed.

Due to the parameters associated with charging and discharging, one may wish to vary the shape of the electrodes. The considerations associated with each phase (charge and discharge) should be correlated with overall effeciencies. During discharge a long type of electrode may be worthwhile because of desire of even electrolytic action on metal surface. However on charging, a long electrode may not be desirable due to need of removing gaseous chlorine from electrode surface in order to prevent passivation of said surface. In order to remove the gas, higher flow rates would be needed thereby increasing pumping requirements. Therefore, while flow rates are mainly determined by size of electrode surface, other factors are also taken into consideration.

Further, electrodes of larger or smaller surface areas may be employed depending on the particular use of the battery. In addition, the electrodes could be spaced either further apart or closer together. Once again, this is a determination of the end use in which the battery is to be employed. Also, a number of cells may be connected to give the desired additive effect in order to increase the amount of power of the entire battery system.

It is understood that the following claims are intended to cover all of these and other specific features of the invention herein described and all statements of the scope of the invention which, as a matter of language, might be said to fall therebetween.

What is claimed:

1. A method for producing electric current from an electrical energy storage device having an electrode compartment means containing therein a positive electrode means and a negative electrode means comprised of a metallic surface, which will combine electrochemically with a halogen, comprising the steps of:
   (1) Circulating an aqueous metal halide electrolyte solution sequentially past said electrode means in said electrode compartment means, externally of said electrode compartment means and back past said electrode means;
   (2) Contacting said electrolyte solution while it is being circulated externally to said electrode compartment means with solid halogen hydrate whereby halogen hydrate or the thermal decomposition products thereof, namely, halogen and water, are passed into said electrolyte solution; and
   (3) Completing the circuit between said positive and negative electrode means.

2. The method of claim 1 wherein said negative electrode comprises a Group II–B metal surface.

3. The method of claim 1 wherein said negative electrode comprises a zinc surface.

4. The method of claim 1 comprising in addition heating said halogen hydrate to provide said thermal decomposition products.

5. The process of claim 1 wherein the halogen hydrate is chlorine hydrate.

6. The process of claim 1 wherein the electrolyte is a Group II–B metal halide.

7. The process of claim 6 wherein the metal halide is zinc chloride.

8. The method of claim 1 wherein the electrolyte solution has a concentration of metal halide of from about 0.1% by weight to saturation.

9. A method for producing electric current from an electrical energy storage device having an electrode compartment means, containing therein, a positive electrode means and a negative electrode means comprised of a metallic surface, which will combine electrochemically with a halogen comprising the steps of:
   (1) Circulating an aqueous metal halide electrolyte solution sequentially past said electrode means in said electrode compartment means, externally of said electrode compartment means through a storage means with a solid halogen hydrate therein and back past said electrode means;

(2) Contacting said electrolyte solution while it is being circulated externally to said electrode compartment means with solid halogen hydrate whereby halogen hydrate or the thermal decomposition products thereof, namely, halogen and water, are passed into said electrolyte solution; and (3) Completing the circuit between said positive and negative electrode means.

10. The method of claim 9 wherein the halogen hydrate is chlorine hydrate.

11. The method of claim 9 wherein the electrolyte is a Group II-B metal halide.

12. The method of claim 9 wherein the electrolyte solution has a concentration of metal halide of from about 0.1% by weight to saturation.

13. The method of claim 9 further comprising cooling said storage means to keep said halogen hydrate solid during storage.

14. The method of claim 9 wherein said negative electrode comprises a Group II-B metal surface.

15. The method of claim 9 wherein said negative electrode comprises a zinc surface.

16. The method of claim 9 comprising in addition heating said halogen hydrate to provide said thermal decomposition products.

17. The method of claim 11 wherein the metal halide is zinc chloride.

18. A method for producing electric current from an electrical energy storage device having an electrode compartment means, containing therein, a positive electrode means, a negative electrode means comprised of a metallic surface which will combine electrochemically with a halogen and an ion-permeable diaphragm mounted between said positive electrode means and said negative electrode means so as to provide a positive electrode compartment means and a negative electrode compartment means, comprising the steps of:

(1) Circulating an aqueous metal halide electrolyte solution sequentially past said negative electrode means in said electrode compartment means, externally of said negative electrode compartment means and back past said negative electrode means;

(2) Circulating an aqueous metal halide electrolyte solution sequentially past said positive electrode means in said positive electrode compartment means, externally of said positive electrode compartment means and back past said positive electrode means;

(3) Contacting said electrolyte solution while it is being circulated externally to said positive electrode compartment means with solid halogen hydrate whereby halogen hydrate or the thermal decomposition products thereof, namely, halogen and water, are passed into said electrolyte solution; and (4) Completing the circuit between said positive and negative electrode means.

19. A method for producing electric current from an electrical energy storage device having an electrode compartment means, containing therein, a positive electrode means, a negative electrode means comprised of a metallic surface which will combine electrochemically with a halogen and an ion-permeable diaphragm mounted between said positive electrode means and said negative electrode means so as to provide a positive electrode compartment means and a negative electrode compartment means, comprising the steps of:

(1) Circulating an aqueous metal halide electrolyte solution sequentially past said negative electrode means in said negative electrode compartment means, externally of said negative electrode compartment means and back past said negative electrode means;

(2) Circulating an aqueous metal halide electrolyte solution sequentially past said positive electrode means in said positive electrode compartment means, externally of said positive electrode compartment means through a storage means with a solid halogen hydrate therein and back past said positive electrode means (3) Contacting said electrolyte solution while it is being circulated externally to said positive electrode compartment means with solid halogen hydrate whereby halogen hydrate or the thermal decomposition products thereof, namely, halogen and water, are passed into said electrolyte solution; and (4) Completing the circuit between said positive and negative electrode means.

References Cited

UNITED STATES PATENTS

| | | | |
|---|---|---|---|
| 1,258,266 | 3/1918 | Sokal | 136—154 |
| 1,716,461 | 6/1929 | Portail | 136—155 |
| 2,761,006 | 8/1956 | Kramer | 136—161 |
| 2,855,453 | 10/1958 | Eidensohn | 136—161 |
| 3,051,768 | 8/1962 | Kujas | 136—155 |
| 3,328,202 | 6/1967 | Riffe | 136—155 |
| 3,408,232 | 10/1968 | Blue et al. | 136—155 |

FOREIGN PATENTS

| | | | |
|---|---|---|---|
| 524,076 | 4/1956 | Canada | 136—155 |

WINSTON A. DOUGLAS, Primary Examiner

C. F. LeFEVOUR, Assistant Examiner

U.S. Cl. X.R.

136—155, 162